April 26, 1949.
D. C. HULL
2,468,710
METHOD OF CONDUCTING ALDOL
CONDENSATION REACTIONS
Filed Aug. 19, 1944
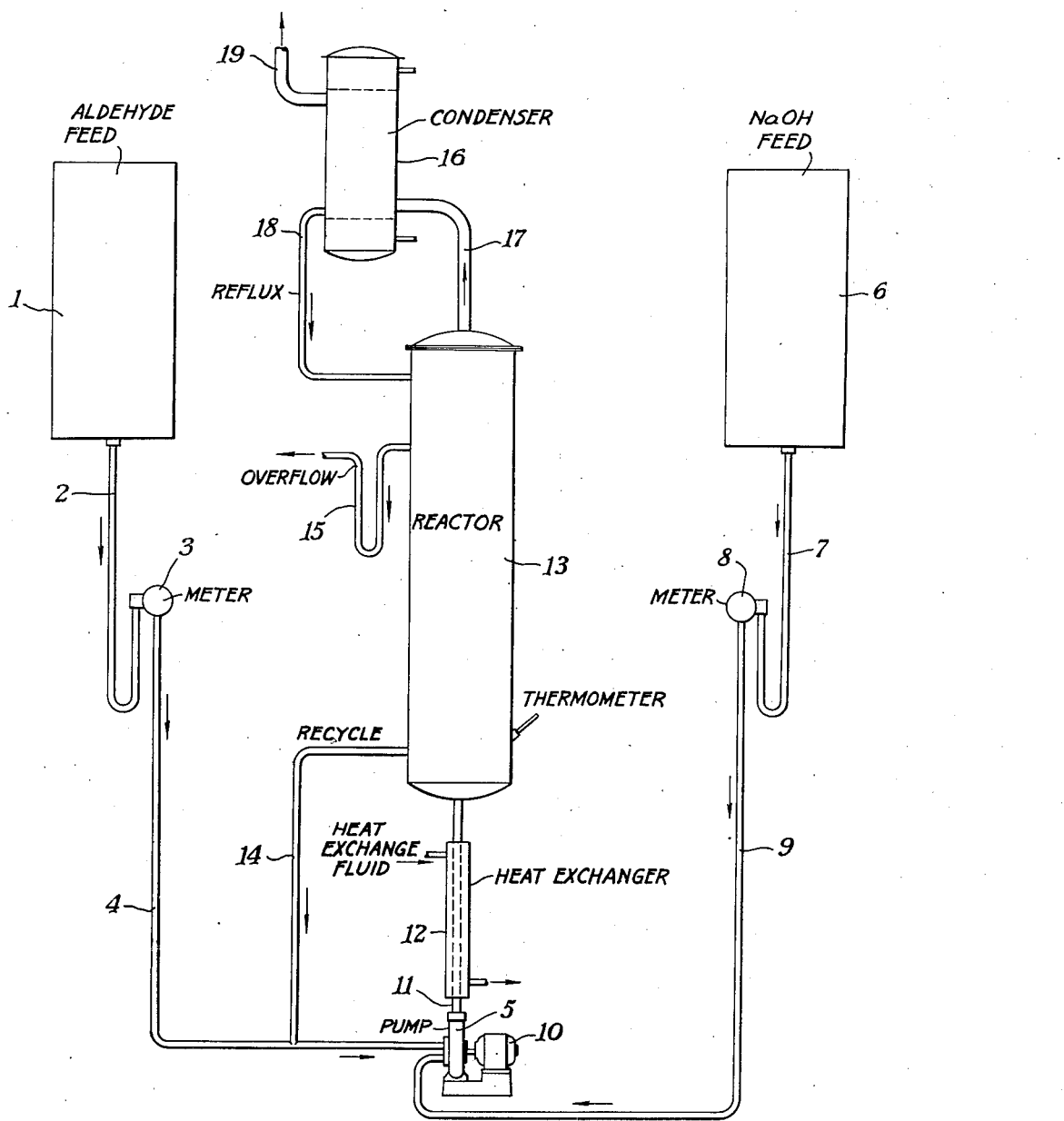
DAVID C. HULL
INVENTOR
BY N. M. Perrins
Daniel I. Mayne
ATTORNEYS Patented Apr. 26, 1949

2,468,710

UNITED STATES PATENT OFFICE 2,468,710

METHOD OF CONDUCTING ALDOL CONDENSATION REACTIONS

David C. Hull, Kingsport, Tenn., assignor to Eastman Kodak Company, Rochester, N. Y., a corporation of New Jersey Application August 19, 1944, Serial No. 550,244

4 Claims. (Cl. 260—602)

This invention relates to the condensation of aldehydes, and more particularly to an improved method of carrying out aldol condensations wherein high yields of product are obtained, reaction time is reduced to a minimum and control of the reaction is facilitated.

Certain subject matter described but not claimed in the instant application is described and claimed in my copending application Serial No. 637,382, filed December 27, 1945, now U. S. Patent 2,428,846.

As is known, various aldehydes may be condensed in the presence of alkaline catalysts to form valuable condensation products. Probably the best known example of this type of reaction is the condensing of 2 molecules of acetaldehyde in the presence of an alkaline catalyst such as sodium hydroxide to form aldol in accordance with the following equation:

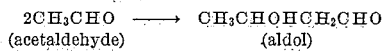
(acetaldehyde)    (aldol)

Similarly, two molecules of butyraldehyde may be condensed to form 3-hydroxy-2-ethyl hexaldehyde in accordance with the equation:

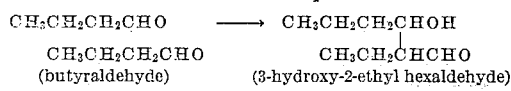
(butyraldehyde)    (3-hydroxy-2-ethyl hexaldehyde)

These condensation products may be subsequently dehydrated to form other valuable materials. For example, aldol may be subjected to dehydration in a separate step to form crotonaldehyde which may be subsequently converted to butyric acid. In like manner 3-hydroxy-2-ethyl hexaldehyde may be dehydrated to produce 2-ethyl-hexenal which may then be hydrogenated to 2-ethyl hexyl alcohol. In the case of higher aldehydes, such as butyraldehyde, the aldol condensation may be carried out at a temperature high enough to cause immediate dehydration of the aldol without formation of polymerization products such as occurs in the condensation of acetaldehyde when high temperatures are used.

When carrying out aldol condensation reactions, heat may be given off or absorbed, depending upon whether or not the reaction is stopped at the aldol stage or carried on to the unsaturated aldehyde stage. The condensations of acetaldehyde to aldol and of butyraldehyde to 3-hydroxy-2-ethyl hexaldehyde, for example, are exothermic, and considerable difficulty has been experienced in the past in obtaining high yields of the desired condensation products because of inability to obtain a proper degree of mixing of the aldehyde with the catalytic materials employed, as well as properly to control the temperature of the reaction mixture. In most cases, this type of reaction has been carried out by the batch method, that is, predetermined amounts of the aldehyde and the catalyst were added to a closed reaction vessel and the reaction permitted to continue until the condensation was regarded as complete. In such procedure, it is always difficult to obtain a uniform temperature throughout the mixture; also local catalyst concentrations cause resin formation. Another disadvantage inherent in this method is that it requires the starting material to be stored for considerable periods of time, resulting in losses, particularly if one is dealing with perishable aldehydes.

Even when operating by the continuous process it has been necessary, in order to obtain even ordinary yields, to employ one or more rather extensive reaction vessels and to permit the reacting mass to remain a considerable length of time in the reaction vessels to complete the condensation. Even under such circumstances, the yields are relatively low and the process is subject to the same inherent disadvantages of the batch method, that is, inability to obtain uniform temperature and catalyst concentrations throughout the reaction mass, inability properly to control this temperature and to obtain maximum yields of the desired condensation product, loss of starting materials by polymerization and various other disadvantages.

This invention has as an object to provide an improved method for carrying out aldol condensations wherein high yields of the condensation products may be obtained. A further object is to improve upon the method of condensing an aldehyde with itself, whereby maximum mixing of the aldehydic material and the catalyst may be effected. A still further object is to provide a means for controlling the temperature of the reactants in an aldol condensation in such manner that, not only will the proper temperature be maintained at all times during the reaction, but also that the temperature, catalyst and reacting feed will be uniform throughout the reacting mass. Another object is to provide a method of carrying out aldol condensations wherein the time required for storage of perishable starting materials and for attaining substantially complete reaction is minimized. A specific object of the invention is to provide an efficient, economical, continuous method for the condensation of acetaldehyde to aldol wherein high yields of aldol may be obtained. Another specific object is to provide a method for the condensation of butyraldehyde to 3-hydroxy-2-ethyl hexaldehyde and dehydration to 2-ethyl hexenal wherein high yields of the latter may be obtained. Another object of the invention is to increase the overall efficiency of, and yields to be obtained in, aldol condensations. Other objects will appear hereinafter.

These objects are accomplished by the following invention which is based upon the discovery that if one brings together in previously mixed reaction liquor the aldehyde to be condensed and the catalyst (for example, an aqueous solution of sodium hydroxide) and conducts the mixture through a conduit of circular cross section at a critical linear velocity, not only can the temperature of the mixture be readily controlled within the desired limits, but the temperature and catalyst can be maintained uniform throughout the reacting mass. I have found that if the liquid aldehyde and the catalyst solution are forced or conducted through a conduit, such as a jacketed iron pipe, at a linear velocity of 5–15 feet per second, just the right degree of turbulence is obtained to bring about the proper amount of mixing and to attain uniform heat distribution and the desired high yields of condensation products in a minimum period of reaction time.

In the following examples and description I have set forth several of the preferred embodiments of my invention, but they are included merely for purposes of illustration and not as a limitation thereof.

The single figure of the accompanying drawing is a diagrammatic illustration, in the nature of a flow sheet, illustrating one of the preferred methods of carrying out aldol condensations in accordance with my invention.

Referring to the drawing, a supply of aldehyde may be contained in a tank 1 equipped with a suitable discharge conduit 2 connected through meter 3 and conduit 4 with impeller pump 5. A similar supply of catalyst solution, for example, a 2% aqueous solution of sodium hydroxide, is contained in tank 6 and is conducted to the impeller pump 5 through conduit 7, meter 8 and conduit 9.

In pump 5, the rotor or impeller of which may be driven by means of motor 10, the aldehyde and catalyst solutions are brought together at approximately the same instant at which they are picked up by the rotating impeller. The reactants thus mixed are forced by the pump through conduit 11 which is surrounded by a heat exchanger, such as a water jacket 12, and thence forced into the bottom of a hollow reactor column 13, which may be an extension of 11 and 12 if a large amount of heat exchange surface is needed. In other words, the volume of 13 is the total volume required for the desired reaction time less the volume in conduit 11. The jacket 12 may be supplied with any suitable heat exchange fluid such as hot or cold water, steam or the like depending upon whether or not it is desired to add heat to, or abstract heat from, the reaction mixture passing through the conduit 11. The actual length of the conduit 11 (and therefore the amount of internal surface) may vary rather widely, since it will depend on the rate of aldehyde condensation, the aldehyde being condensed and the temperature of the cooling or heating medium employed in heat exchanger or jacket 12. The cross section of the conduit 11 should preferably be circular, although it may take other forms, if desired. It should also be noted that where the conduit 11 is a pipe of relatively small diameter, say 2 to 3 inches, the reaction mixture would be passed through the conduit at a rate corresponding to the lower part of the critical range of 3 ft. to 15 ft. per second mentioned above. On the other hand, if the diameter of the conduit were of the order of 10 inches, the linear velocity or flow would be nearer the upper limit of 15 ft. per second to obtain proper turbulence.

The reactor 13 is provided with a return conduit 14 which provides a means for recycling the reaction mixture back through the lower run of conduit 4, thence through the impeller pump (at which point it picks up catalyst solution continuously fed to the pump by conduit 9), thence through conduit 11 and back to the reactor. While the condensation reaction begins to take place immediately upon contact of the aldehyde and the catalyst solution in the pump, the reaction occurs chiefly in the conduit 11 and in the lower portion of the reactor 13. As fluid is continuously fed to the reactor through the conduit 11, it builds up therein and finally overflows through conduit 15 through the seal as shown.

Reactor 13 is also provided with a suitable reflux condenser 16 connected to the top of the reactor through conduit 17. Conduit 18 is attached to condenser 16, as shown, to provide for condensation and return of any condensable vapors as reflux to the reactor, uncondensable gases escaping through vent pipe 19. It is of course understood that any suitable cooling fluid such as water or brine may be supplied to the condenser as indicated.

The operation of the apparatus in carrying out aldehyde condensations in accordance with my invention will be apparent from a consideration of the drawing and from the above equations. The aldehyde is metered from supply tank 1 to the aldehyde feed line at a constant predetermined rate. Similarly, the alkali solution is metered from tank 6 to the alkali feed line also at a predetermined rate. These two liquids find their way into the impeller pump at approximately the same point where they are caught up by the rapidly rotating impeller, intimately mixed with reaction liquor from the reactor vessel 13 and driven into the conduit 11. The condensation of the aldehyde begins almost immediately upon contact with the catalyst solution and, as the commingled liquids are carried through conduit 11 at the specified linear velocity, they are churned to a highly turbulent condition which causes condensation to proceed in the proper direction at the expense of undesirable side reactions, which is not possible when the aldehyde is condensed under the relatively quiescent conditions characteristic of the prior art methods above referred to. The aldehyde-alkali mixture is carried into the bottom of the reactor 13 where the last portion of condensation reaction is completed as the fluid therein builds up to the level of the overflow 15, through which it is withdrawn, carrying with it entrained condensation product. A portion of the fluid in the bottom of the reactor 13 is recycled through conduit 14 as desired to effect immediate dilution and intimate mixing of catalyst and reactants, to avoid local heating and local catalyst concentrations which cause resin formation.

The temperature of the reaction in the conduit 11 and the reactor 13 may be controlled by supplying a proper heat exchange fluid to the jacket 12, the fluid being heated in those cases where the reaction is endothermic and being cooled in those instances where the reaction is exothermic. In any event, the temperature of the fluid passing through conduit 11 is so controlled as to give the proper temperature for the condensation reaction to continue as desired in both conduit 11 and reactor 13. The temperature to be employed for any given aldol condensation will of course vary in accordance with the aldehyde being condensed. For example, I have found that a temperature of 0° to 25° C. is a satisfactory range of temperatures for the formation of aldol from acetaldehyde in accordance with my process. Temperatures several degrees below 0° C. can be employed, but giving much slower reaction rates and are therefore not as desirable. On the other hand, the use of temperature above 25° C. is, generally speaking, undesirable, since too many by-products are formed if a sufficient amount of catalyst to obtain reasonable conversion per pass is employed. For conversion of butyraldehyde to 3-hydroxy-2-ethyl hexaldehyde, I prefer to use temperatures ranging from 0° to 35° C., but if it is desired to produce 2-ethylhexenal simultaneously with the condensation reaction, I would employ temperatures of the order of 92–95° C. or the reflux temperature of the 2-ethyl hexenal-water azeotrope.

It may be noted that temperatures in conduit 11 and in the reactor 13 are substantially the same because of the relatively large quantity of liquid being circulated from 13 and mixed with the incoming feeds.

Inasmuch as some of the constituents of the liquid present in reactor 13 may be volatilized under the conditions prevailing therein, provision is made for condensing vaporized aldehyde and other constituents in condenser 16, uncondensables being vented from the system from conduit 19.

My invention will be more fully explained by reference to the following illustrative examples thereof.

*Example 1.*—Liquid acetaldehyde is metered into a system such as the pump 5, conduit 11 and reactor 13 illustrated in the drawing, at a rate of 25 liters per minute. A 2% aqueous solution of sodium hydroxide is metered into the system at approximately the same point of introduction as the liquid aldehyde at the rate of 8 liters per minute. Both fluids upon entering the impeller pump are immediately picked up, and thoroughly mixed with recycled reaction liquor entering through conduit 14. Feed and recycled liquor are violently agitated together and mixed and then forced out of the pump into the conduit 11. The impeller or rotor of the pump is operated at such a speed that the mixture of fluids is forced into and through the conduit 11 at a linear velocity of 3 to 15 feet per second. Brine or cold water is supplied to the jacket 12 in a sufficiently high quantity at the right temperature to maintain the fluid therein at a reaction temperature of 5° C. to 10° C.

By operating at this linear velocity of fluid flow in the conduit 11, exactly the right degree of turbulence of the fluids is obtained to bring about rapid initial stages of the condensation of the acetaldehyde to aldol with a minimum of formation of by-products. The process when thus operated in accordance with my invention gives a reaction time that can be varied to suit the best conditions for the particular aldehyde being treated by varying the hold-up volume in the reactor vessel 13. In the case of aldol formation from acetaldehyde, optimum total reaction time is found to be 60 to 120 minutes.

The reaction mixture may be withdrawn from the reactor through seal 15, after which it may be distilled or otherwise treated in accordance with known procedures to separate the aldol. It will of course be understood that the volume of liquid continuously withdrawn through the seal 15 will be substantially equal to the volume of the liquid aldehyde and aqueous sodium hydroxide introduced into the system minus the volume of any products which may have been produced by side reactions and carried out of the system as uncondensables.

96% of the aldehyde converted is obtained as aldol.

*Example 2.*—Butyraldehyde may be condensed to 3-hydroxy-2-ethyl hexaldehyde with immediate dehydration to 2-ethyl hexenal in a manner exactly analogous to the condensation of acetaldehyde to aldol as outlined in Example 1. In this case, liquid butyraldehyde is metered to the system through pump 5 at the rate of 3 liters per minute, while a 2% aqueous sodium hydroxide solution is metered to the pump at the rate of 3 liters per minute. The temperature of the reaction is maintained at 95° C. and the impeller pump is operated at such a speed as to produce a linear velocity of fluid in the conduit 11 of 3 to 15 feet per second. Yields of 90 to 97% of the desired condensation product are thus obtained at an elapsed reaction time of 20 to 180 minutes.

While in the above examples, I have illustrated the practice of my invention by reference to the condensation of specific aldehydes and the employment of specific reaction conditions, it will be evident that my process may be applied with equal facility to the condensation of other aldehydes such as formaldehyde, propionaldehyde and valeric aldehyde.

The specific temperatures or temperature ranges employed for the condensation of such aldehydes will of course vary with the particular material and the velocity of the fluid in the conduit 11. However, regardless of the specific materials condensed, I have found that the maintenance of a specific linear velocity in the system in the reaction conduit 11 is necessary in order to obtain the improved results desired. In other words, I have found that there is a critical relationship between the yields and time required to complete the reaction and the velocity at which the mixed fluids are passed through the conduit. While I do not limit myself to any particular theory to explain the unusual results obtained, I believe that this critical velocity range produces the exact degree of turbulence required to produce optimum yields at a minimum reaction time. I have found that if the velocity drops much below three feet per second, insufficient mixing and contact of the reactants is obtained to produce any appreciable improvement, either in yields or in reaction time. Similarly, if the velocity increases above 15 feet per second, the increased turbulence gained by increased velocity is of no further aid and heat added by the friction is objectionable.

As an illustration of the unexpected improvement to be obtained by the practice of my invention, it may be said that, whereas under the usual prior art methods of simply mixing an aldehyde with an alkali solution and permitting it to stand or to progress slowly through a reaction vessel, the yield of aldol and similar aldehyde condensation products, is of the order of 80% to 85%, by my method I can obtain yields of 90% to 97%.

My process also possesses the great advantage of continuous operation, easy and exact control of catalyst concentrations and reaction temperatures and an assurance of uniformity of temperature and catalyst throughout the mass of the reacting fluids, thus avoiding local overheating or underheating of the aldehyde in contact with the alkaline catalyst or local concentrations of catalyst both of which are detrimental to proper reaction results.

It will thus be seen that I have provided a new and greatly improved method for the condensation of aldehydes to valuable condensation products and have made it possible, not only to obtain high yields at a minimum reaction time, but also to avoid loss of aldehyde through a protracted storage period or a protracted period in the reacting vessel. In other words, my process greatly facilitates the manufacture of aldehyde condensation products in an efficient and economical manner which constitutes a decided step forward in the art.

What I claim is:

1. In the continuous process of condensing an aliphatic aldehyde to the corresponding aldol condensation product wherein the aldehyde in liquid form is mixed with a liquid solution of an aldol condensation catalyst, the steps which comprise continuously bringing the liquid aldehyde and the catalyst solution into contact and passing the mixture of liquids first through a conduit of 2 inches to 10 inches diameter at a linear velocity within a range of 3 feet to 15 feet per second, whereby turbulent flow and immediate and thorough mixing of the two liquids in the conduit is obtained, and then passing the thoroughly mixed liquids into a non-turbulent zone and maintaining the liquids in said zone until substantial completion of the condensation reaction.

2. In the continuous process of condensing aldehyde to aldol wherein the aldehyde in liquid form is mixed with a liquid solution of an aldol condensation catalyst, the steps which comprise continuously bringing the aldehyde and the catalyst solution into contact and passing the mixture of liquids through a conduit of 2 inches to 10 inches diameter at a linear velocity within a range of 3 feet to 15 feet per second, whereby turbulent flow of the liquid mixture results and immediate and thorough mixing of the two liquids in the conduit is obtained, and then passing the thoroughly mixed liquids into a non-turbulent zone and maintaining the liquids in said zone at a temperature of 0°–25° C., until substantial completion of the condensation reaction.

3. In the continuous process of condensing butyraldehyde to 3-hydroxy-2-ethylhexaldehyde wherein the aldehyde in liquid form is mixed with a liquid solution of an aldol condensation catalyst, the steps which comprise continuously bringing the liquids in contact and continuously passing the mixture of liquids first through a conduit of 2 inches to ten inches diameter at a linear velocity within a range of 3 feet to 15 feet per second, whereby turbulent flow of the liquid mixture results and immediate and thorough mixing of the two liquids in the conduit is obtained, and then passing the liquids into a non-turbulent zone and maintaining the liquids in said zone at a temperature of 0°–35° C. until substantial completion of the condensation reaction.

4. In the continuous process of condensing butyraldehyde to 3-hydroxy-2-ethylhexaldehyde with simultaneous dehydration of the latter to 2-ethylhexenal, the steps which comprise continuously feeding liquid butyraldehyde into contact with the catalyst solution and continuously passing the mixture of liquids through a conduit of 2 inches to 10 inches diameter at a linear velocity within the range of 3 feet to 15 feet per second, whereby turbulent flow of the liquid mixture results and immediate and thorough mixing of the two liquids in the conduit is obtained, and then passing the thoroughly mixed liquids into a non-turbulent zone and maintaining the liquids in both the conduit and in the non-turbulent zone at a temperature of 92°–95° C., and holding the mixed liquids in the non-turbulent zone until substantial completion of the condensation reaction.

DAVID C. HULL.

REFERENCES CITED

The following references are of record in the file of this patent:

UNITED STATES PATENTS

| Number | Name | Date |
|---|---|---|
| 1,598,522 | Herrly et al. | Aug. 31, 1926 |
| 1,881,853 | Mueller-Conradi et al | Oct. 11, 1932 |
| 2,130,592 | McAllister | Sept. 20, 1938 |
| 2,309,650 | McAllister et al | Feb. 2, 1943 |
| 2,318,341 | Thompson | May 4, 1943 |

OTHER REFERENCES

Weizmann et al.: "Journal of the Chemical Society" (London), vol. 117, page 329 (1920).